May 16, 1961  G. E. JODELL ET AL  2,983,963
METHOD OF MAKING MULTIDENSITY EXPANDED PLASTIC BODY
Filed July 17, 1956  2 Sheets-Sheet 1
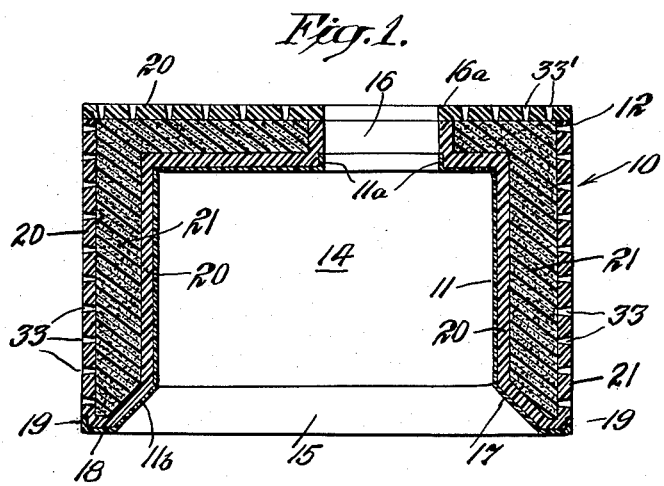
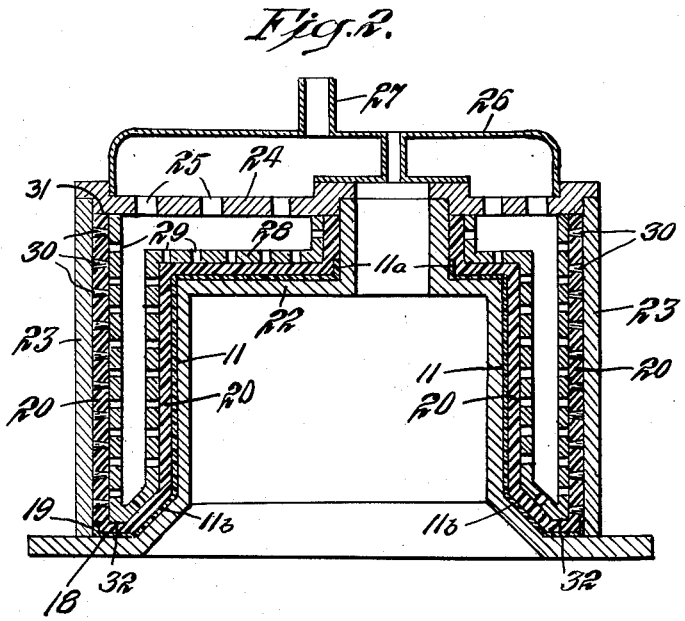
INVENTORS

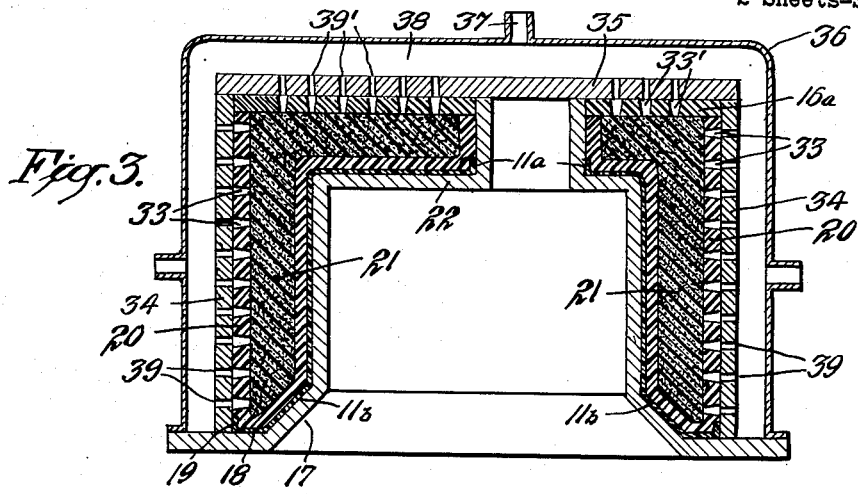
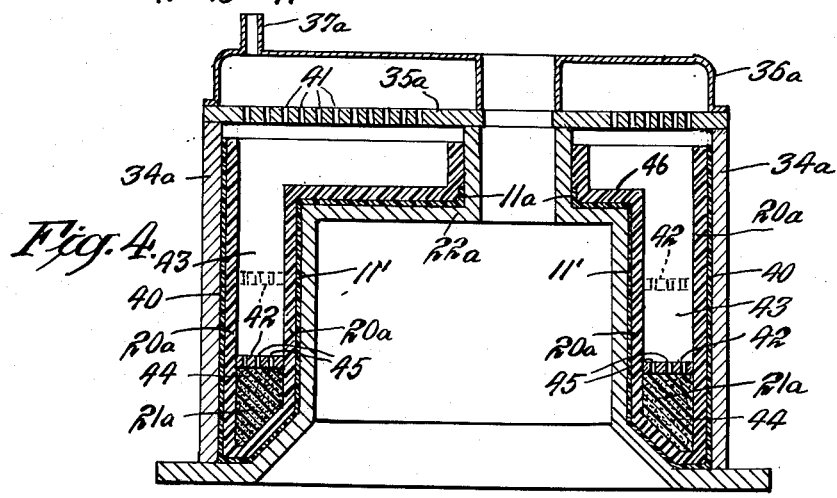

United States Patent Office 2,983,963
Patented May 16, 1961

2,983,963
METHOD OF MAKING MULTIDENSITY EXPANDED PLASTIC BODY

Georg Elis Jodell, Toorak, Victoria, Australia, and Anders Lindstrom, Bromma, and Sven Ysberg, Sundbyberg, Sweden, assignors to Aktiebolaget Elektrolux, Stockholm, Sweden, a corporation of Sweden Filed July 17, 1956, Ser. No. 598,426

Claims priority, application Sweden July 20, 1955

3 Claims. (Cl. 18—59)

This invention relates to a method of making multidensity expanded plastic bodies.

It is an object of the invention to provide an improved method of making a multi-density expanded plastic wall structure by introducing an expandable plastic into a hollow space or cavity of an expanded plastic body and expanding it in situ therein to form an inner portion of less density than that of an outer portion.

The above and other objects and advantages of the invention will be more fully understood from the following description taken in conjunction with the accompanying drawings forming a part of this specification, and of which:

Fig. 1 is a horizontal sectional view of a refrigerator cabinet embodying the invention;

Figs. 2 and 3 are horizontal sectional views of molds employed in forming the refrigerator cabinet shown in Fig. 1; and Figs. 4 and 5 are horizontal sectional views of molds and illustrate alternative ways of forming refrigerator cabinets like the one shown in Fig. 1.

Referring to Fig. 1, the invention is shown in connection with a refrigerator cabinet 10 having an inner liner 11 forming part of an insulating body 12. The inner liner 11 defines a thermally insulated storage space 14 having an opening 15, access to the storage space 14 being afforded by a door (not shown) which may be pivotally mounted in position in any suitable manner.

The storage space 14 is arranged to be cooled by a cooling element or evaporator (not shown) which may be inserted into the cabinet through an opening 16 in the rear wall 16a, a suitable closure member (not shown) usually being provided to close the rear opening 16.

The inner liner 11 comprises a relatively thin layer of a suitable plastic material, such as a polyester, for example. By way of example, the inner liner 11 may be of polystyrene sheet which is shaped by vacuum forming. When the inner liner 11 is vacuum or pressure formed, a relatively thin liner which is of a thickness in the neighborhood of 0.3 to 0.5 mm. may be produced. The inner liner 11 may be in one piece or in several parts which are fused, bonded or otherwise united together in any suitable manner. If desired, the inner liner 11 may be formed by injection molding, in which case the thickness of the liner will be greater than the range of 0.3 to 0.5 mm. given above.

In the embodiment of Fig. 1, the top, bottom, rear and lateral side walls of the storage space 14 are formed by the inner liner 11 which is extended into a rear section 11a projecting a short distance into the rear opening 16, and a front section 11b forming the throat 17 of the front access opening 15 and extending across the front 18 and a short distance rearwardly at 19 at the exterior of the cabinet.

In order to provide a cabinet of adequate strength and rigidity, the thermally insulated walls thereof each comprise spaced apart outer layers 20 of expanded plastic of a relatively high density and an inner layer 21 of expanded plastic of a low density therebetween. The refrigerator cabinet 10 of Fig. 1 may be employed as a built-in refrigerator, and when it is used in this manner, the outermost outer layers 20 will be hidden from view. Since an outer shell or casing is not needed when the refrigerator cabinet 10 is installed as a built-in refrigerator, only the section 11b extending toward the front of the cabinet from the inner linear 11 to the region 19 at the exterior of the cabinet is required.

In accordance with this invention, the refrigerator cabinet 10 shown in Fig. 1 may be formed in several steps with the aid of molds like those shown in Figs. 2 and 3. Referring to Fig. 2, the mold for forming the outer layers 20 of expanded plastic includes an inner part 22 and an outer part consisting of four sections 23, two of which are shown in Fig. 2, the other two being at right angles to those illustrated and connected to their ends. The mold in Fig. 2 further includes a top section 24 having openings 25 therein, and a hood 26 which overlies the top section and is formed with an inlet connection 27 for conducting a heating transfer medium into the interior of the mold.

As shown in Fig. 2, the mold is provided with an inner core 28 having openings 29 therein. The four outer sections 23 of the mold are formed with conical-shaped pegs 30 which extend inwardly therefrom and bridge the gaps or spaces 31 between the sections 23 and inner core 28. The pegs 30 are spaced apart and distributed over substantially the entire inner faces of the mold sections 23.

When the outer layers 20 of expanded plastic are to be formed, the inner part 22 and four outer sections 23 of the mold are clamped or joined together in any suitable manner, after which the inner liner 11, together with its rear and front sections 11a and 11b, is inserted into position in the manner shown in Fig. 2. The inner core 28 is placed in position and supported in any suitable manner at the bottom thereof, as by pins (not shown), for example, to provide the gap 32 at the front end of the cabinet 10. Beads or granules of an expandable thermoplastic like polystyrene, for example, which is available under the trade means "Styrofoam," "Styropor" and "Dylite," are then introduced into the spaces between the inner core 28 and the inner line 11 which bears against the mold parts 22 and 23. In order to effect uniform distribution of the beads or granules about the pegs 30, the mold parts 22 and 23 may be vibrated while the expandable thermoplastic is being introduced into the spaces between the mold parts. The top mold section 24 and hood 26 are then clamped in place and a heating medium, such as steam, is delivered to the mold through the inlet connection 27. While steam at a temperature of about 110° C., for example, is being supplied to the mold, the mold may be immersed up to the hood 26 in a body of hot water at a temperature of 100° C., for example. When subjected to such heating, the polystyrene beads or granules expand, causing the beads to fuse together and form the rigid spaced apart outer layers 20 of the several walls of the insulating body 12.

When the expansion or foaming of the expandable thermoplastic has been completed, the mold is cooled in any suitable manner. This may be accomplished by introducing cold air through the inlet connection 27 of the hood 26 and employing cold water to cool the outside of the mold. After the mold has been cooled to a sufficiently low temperature, the hood 26 and top mold section 24 may be removed; and, after the inner core 28 is taken out of the interior of the mold, the mold sections 23 are carefully removed one at a time so that the spaces which were occupied by the pegs 30 will result in well-defined openings 33 in the outermost outer layer 20. This may be effected, for example, by keeping each mold section 23 substantially parallel to the outer layer 20 from which it is being separated during its movement therefrom.

The mold parts and inner core 28 desirably are of light weight. When the walls of the mold parts are kept as thin as possible, minimum quantities of heating and cooling media are needed in the heating and subsequent cooling of the expandable plastic. However, the mold parts should be strong enough so that the mold will withstand the pressure encountered when the expandable thermoplastic is being heated.

The outside outer layer 20 for the rear wall 16a of the cabinet 10 of Fig. 1 may be formed in a suitable mold in a separate operation. The outside outer layer 20 of the rear wall 16a in Fig. 1 is provided with conical-shaped openings 33' and is formed in generally the same manner as the outermost outer layers 20 of the other walls, as shown in Fig. 2 and just described, so that it will conform to the latter in physical characteristics and have the same relatively high density.

In order to form the inner layer 21 of expanded plastic within the spaced apart outer layers 20, a suitable mold is employed which, as shown in Fig. 3, includes the same inner mold part 22 illustrated in Fig. 2. In Fig. 3, four mold sections 34 replace the mold sections 23 previously employed in Fig. 2. After the inner mold part 22 and side sections 34 are clamped or joined together in any suitable manner, the outer portion of the cabinet wall structure formed in the mold of Fig. 2 is positioned in the cavity formed by the mold part 22 and the outer side sections 34. Beads or granules of an expandable thermoplastic like polystyrene, for example, may be introduced into the space between the spaced apart wall layers 20, after which the outer wall layer 20 of the rear wall 16a is placed in position. A top mold part 35 is then clamped or connected to the other mold parts in any suitable manner, and a hood 36, which rests on an outwardly extending flange of the inner mold part 22, is then fixed in position about the side sections 34 and top 35 of the mold.

A heating medium, such as steam, is introduced through several inlet connections 37 into the space 38 about the mold. Each of the side sections 34 and top section 35 of the mold is formed with openings 39 and 39', respectively, which are in communication with the openings 33 and 33' formed in the outermost wall layers 20. In this way, the steam supplied to the space 38 is effectively distributed and flows into all regions of the space between the outer wall layers 20 through the multiplicity of passages formed by the openings 39 and 33 and openings 39' and 33', respectively. When subjected to heating in this way by steam at a temperature of about 110° C., for example, expansion or foaming of the polystyrene beads or granules is effected, the beads fusing together to form the inner layers 21 of the several walls of the cabinet 10.

The density of the outer wall layers 20 and inner wall layers 21 in each instance may readily be controlled by employing a quantity of expandable thermoplastic which will have the desired foaming characteristics. For example, a quantity of lightly pre-foamed beads or granules of expandable thermoplastic capable of expanding or foaming only to a relatively small extent in a mold may be employed in the molding step illustrated in Fig. 2 and described above to yield rigid outer layers 20 of comparatively high bulk density. Although not to be limited thereto, outer layers 20 in a range of 5 to 10 mm. thick have been produced for use in refrigerator cabinets like that shown in Fig. 1 and described above. Outer wall layers 20 of such thickness, having a relatively high density, have been found quite satisfactory and possess adequate mechanical strength and rigidity.

During the expansion or foaming operation in the molding step shown in Fig. 2, the outer wall layers 20 at the vicinity of the liner 11 become bonded thereto. Similarly, during the expansion or foaming operation in the molding step shown in Fig. 3, the inner layers 21 become fused and bonded to the outer layers 20.

A quantity of expandable thermoplastic capable of expanding to a relatively large extent in a mold is employed to yield solid inner wall layers 21 of comparatively low bulk density. By way of example, the expandable thermoplistic may be of a type which has undergone pre-expansion. In any event, by choosing an expandable thermoplastic with physical characteristics which will produce a body of foamed material which is relatively light in weight, inner layers 21 may be formed which will fit tightly in the space or gap between the outer layers 20, thereby contributing to the strength of the resulting wall structure formed. While expandable thermoplastic materials of different types may be employed to provide the outer and inner layers 20 and 21, it has been found that the best bond between the outer and inner layers is obtained when the same type of expandable thermoplastic is employed for both.

When expansion of the expandable material has been completed in the molding step of Fig. 3, the mold may be cooled by introducing cold air through the several inlet connections 37 of the hood 36. Thereafter, the mold is taken apart and the resulting cabinet 10, which is like that illustrated in Fig. 1, is removed therefrom. The molding step shown in Fig. 3 may be carried out in such a way that the openings 33 and 33' are filled with expanded thermoplastic which penetrates therein from the space between the outer layers 20.

When fabricating a household refrigerator which is not to be built in, it is desirable to provide an outside shell or covering which is neat in appearance. This may be done in the case of a refrigerator cabinet like cabinet 10 in Fig. 1, which is especially suitable for built-in installation, if the outer covering is of the same general type as the inner liner 11 of Fig. 1, the outer covering being bonded to the outermost layer 20 at the time the latter is formed in a molding step like that shown in Fig. 2 and described above. However, the pegs 30 at the inner faces of the side wall sections 23 would be omitted when producing the outer wall layers for a cabinet to be provided with an outer plastic covering.

One of the features of the molding step shown in Fig. 3 and described above is that the expandable themoplastic forming the inner wall layer 21 may be foamed in a single heating operation, because openings 39 and 39' in the mold sections which communicate with the openings 33 and 33' in the outermost wall layers 20 enable steam to be distributed to all regions of the expandable thermoplastic forming the inner wall layer 21. When an outer covering is to be provided for the refrigerator cabinet, the expandable thermoplastic forming the inner wall layer 21 cannot be foamed in a single heating operation because of the absence of the openings 33 and 33' in the outer layers 20 of the cabinet walls.

A way the inner layer 21a may be formed in several heating steps is shown in Fig. 4 which illustrates a mold adapted to hold an expanded or foamed plastic body having outer wall layers 20a, and an inner liner 11' bonded thereto in the same manner as in the first-described embodiment illustrated and described above. In Fig. 4, however, it will be seen that the foamed plastic body also includes an outer covering 40, which may be polystyrene shaped in any suitable manner and fused or otherwise united to the inner liner part. As explained above, the outer covering 40 may be bonded to the outer wall layers 21a at the time the foamed plastic body of Fig. 4 is produced in a molding step generally like that shown in Fig. 2 and described above, the only difference being that the pegs 30 in the side mold sections 23 are omitted.

In the embodiment illustrated in Fig. 4, the mold includes an inner part 22a, four side sections 34a and a top section 35a having openings 41 therein. To produce the inner expanded or foamed plastic layer 21a, the aforementioned mold sections are clamped together in any suitable manner and a hood 36a is fixed in position over the top section 35a. A heating medium, such as steam, is then supplied to the hood through an inlet connection 37a, which passes through the openings 41 into the space between the outer wall layers 20a.

In order to promote good foaming and expansion of the expandable thermoplastic used in forming the inner foamed plastic layer in Fig. 4, the latter can be produced in several stages in a plurality of heating steps. In accord with the invention, a four-sided frame 42 is employed which snugly fits in the annular-shaped gap 43 extending about the outer wall layer 20a bonded to the inner liner 11a. When the frame 42 is used, a quantity 44 of the expandable thermoplastic, which may be of a beaded type and like that referred to in the first-described embodiment, may be introduced into the bottom portion of the gap 43. After the frame 42 has been positioned over this initial charge of expandable material and the mold parts have been clamped together in any suitable manner, steam may be supplied to the hood 36a through the inlet connection 37a. The heating medium passes through the openings 41 into the gap 43 and then through openings 45 in the frame 42 into intimate contact with the charge 44 of expandable thermoplastic. After foaming and expansion of the charge 44 has been completed, the supply of steam is discontinued and cold air may then be delivered to the mold to effect cooling thereof.

An additional quantity of expandable thermoplastic may then be introduced into the gap 43 and the frame 42 positioned over such material which may then elevate it to the dotted line position shown in Fig. 4. Heating of the second and subsequent charges of expandable thermoplastic may be accomplished in the same way as the initial charge 44, as described above, until the inner wall layer is built up to the region 46, after which the inner wall layer is built up to the region 46, after which the remainder of the inner wall layer can be produced in a single heating step. When this final heating step is undertaken, an outer wall layer such as the rear wall part 20 shown in Fig. 3, which is provided with openings 33', may be fixed in position beneath the top mold section 35a. In this way, heating of the final charge of expandable thermoplastic will result not only in the foamed thermoplastic being bonded to the next to the last charge, but also to the outer layer of the rear wall of the cabinet. In the embodiment of Fig. 4, frame 42 desirably is sufficiently heavy to withstand the pressure developed as each charge of expandable thermoplastic is being foamed and expanded. If the frame 42 is not sufficiently heavy in itself for this purpose, it may be provided with additional weights in any suitable manner. Further, it is necessary to make certain that the quantity of expandable thermoplastic introduced into the gap 43 for each charge is not unduly large. An individual charge of expandable thermoplastic which is excessive may interfere with proper foaming, because the requisite heating of all of the material will not be effected. Experience will determine the quantity needed to obtain good foaming within a reasonable length of heating time.

Another way of supplying heat to foam and expand a thermoplastic to form the inner layer of cabinet walls is illustrated in Fig. 5. The mold in Fig. 5 is generally similar to that shown in Fig. 4 and includes an inner section 22b, four side sections 34b and a top section 35b having openings 41b therein. The plastic body held in the mold parts 22b and 34b is like that illustrated in Fig. 4 and includes outer layers 20b of expanded plastic which are of relatively high density, and inner liner 11" and an outer covering 40b bonded thereto.

In Fig. 5, the entire cavity or gap 43b between the spaced apart layers 20b is filled with a slitable expandable thermoplastic like polystyrene, for example, as in the embodiment first described. The outer layer 20b', which possesses the same physical characteristics as the outer layers 20b and will serve as a part of the rear wall of the cabinet to be formed from the plastic body, is then placed in position beneath the top mold section 35b. After the mold sections are clamped together in any suitable manner, steam is supplied through the inlet connection 37b to the hood 36b. The outer layer 20b' is formed with openings 33b' which are in alignment with the openings 41b to provide passages for flowing steam from the hood 36b into the cavity or gap 43b between the spaced apart outer wall layers 20b.

In order to effect good distribution of the heating medium to all regions of the charge of expandable thermoplastic in the cavity or gap 43b, a number of hollow core members 47 depend into the gap from the top mold section 35b. As shown, the hollow core members 47 are of tubular form and are provided with a multiplicity of openings 48 along their lengths. The core members 47 extend through openings 49 in the outer layer 20b' and openings in the top mold section 35b and may be supported by the latter in any suitable manner, as indicated at 50.

By employing core members 47 of suitable length in proper distribution about the annular-shaped gap 43b, the charge of expandable thermoplastic filling the gap can be foamed and expanded in a single heating step. After the inner wall layers have been produced and the mold has been cooled and the hood 36b removed, the inner core members 47 are removed to provide the channels 51. In order that the insulating ability of the outer layer 20b' will not be impaired, the openings 49 therein can be filled with suitable insulation in any suitable manner.

When the cabinet is produced in accord with the embodiment of Fig. 5, it may be associated with refrigeration apparatus in such a way that the hollow channels 51 are in communication with the storage space 14b in which the evaporator of the refrigeration apparatus is positioned. Such an arrangement will allow air to circulate in a path of flow between the evaporator or cooling element and the hollow channels 51, so that any moisture in the insulated walls will be withdrawn therefrom and eventually condense on the evaporator surfaces which are below the dew point. Alternatively, the hollow channels 51 may be arranged so that air will circulate in a path of flow between their open ends at the rear outer layer 20b' and a low temperature part of the refrigeration apparatus arranged at the rear of the cabinet and insulated from the surroundings. Accordingly, the hollow channels 51 in this embodiment are advantageous in that they may be employed to remove moisture from the insulation in a manner like that referred to above and generally described in United States Letters Patent No. 2,639,593 to R. E. Deutgen.

In view of the foregoing, it will now be understood that an improved multi-density expanded plastic wall structure has been provided which possesses requisite strength and rigidity and at the same time has excellent thermal insulating properties. It will be understood, also, that the inner core members 28 in Fig. 2 may be so formed and shaped that stiffening or strengthing ribs which are perpendicular to and extend inwardly from the outer wall layers 20 will be provided at the inner surfaces of the latter. Also, in the embodiment of Fig. 4, relatively thin transverse layers of expanded plastic may be produced between the larger bodies of expanded plastic of relatively low density to impart additional rigidity and strength to the wall structure.

In the embodiments described above the mold parts or sections and cores desirably are shaped and formed to provide the proper clearance for the parts and cores to be separated from the plastic bodies which are molded. Also, the mold parts and cores may be lubricated in any suitable manner whenever this becomes necessary in order to prevent the expanded or foamed material from adhering to them and to facilitate separation of the foamed material from the mold and core surfaces.

Modifications of the invention which has been described will occur to those skilled in the art, and as it is desired that the invention not be limited to the particular arrangements set forth, it is intended in the claims to cover all those modifications which do not depart from the spirit and scope of the invention.

What is claimed is:

1. In a method of forming an article from foamable thermoplastic of granular form, the improvement which comprises providing a first body of the foamable plastic between an inner mold and an outer mold which includes a section having pegs distributed about its inner face and extending inwardly therefrom to the outer face of the inner mold, heating the first body of plastic to a temperature at which it foams and expands to form a hollow member having a cavity, cooling the hollow member, removing from the member at least the inner mold and the pegged section of the outer mold so as to provide the member with a cavity defined at least in part by an apertured wall, providing a second body of foamable plastic in the cavity of the member while the latter is retained in a mold, heating the second body of plastic to a temperature at which it foams and expands to form a filling which fuses and becomes bonded to the inner wall surface of the hollow member to form the article, the heating of the second body of plastic including the step of supplying a heating medium thereto through the apertures in the wall of the hollow member, and cooling the second body of expanded plastic.

2. The improvement set forth in claim 1 in which the second body of foamable plastic is provided in the cavity of the member while the latter is retained in a mold including a part having apertures in communication with the apertures in the wall of the hollow member, and heating the second body of plastic by supplying a heating medium to the apertured part of the mold.

3. In a method of forming an article from foamable thermoplastic of granular form, the improvement which comprises providing a first body of the foamable plastic between spaced inner and outer molds, heating the first body of plastic to a temperature at which it foams and expands to form a hollow member having a cavity, cooling the hollow member, removing from the member at least the inner mold, providing a second body of the foamable plastic in the cavity of the member while the latter is retained in a mold, heating the second body of plastic to a temperature at which it foams and expands to form a filling which fuses and becomes bonded to the inner wall surface of the hollow member to form the article, building up the second body of foamable plastic in the cavity of the member layer by layer while the member is retained in its mold, positioning an apertured mold part in contact with the top surface of each layer of foamable plastic after it is provided in the cavity, the heating of the second body of plastic including the step of supplying a heating medium through the apertured wall part to each layer after it is provided in the cavity, and cooling the second body of expanded plastic.

References Cited in the file of this patent

UNITED STATES PATENTS

| | | |
|---|---|---|
| 2,150,287 | Minor | Mar. 14, 1939 |
| 2,247,337 | Raflovich | June 24, 1941 |
| 2,320,425 | Glaes et al. | June 1, 1943 |
| 2,376,653 | Boyer | May 22, 1945 |
| 2,409,910 | Stober | Oct. 22, 1946 |
| 2,474,676 | Kelly | June 28, 1949 |
| 2,484,608 | Cheyney et al. | Oct. 11, 1949 |
| 2,552,641 | Morrison | May 15, 1951 |
| 2,642,920 | Simon et al. | June 23, 1953 |
| 2,744,291 | Stastny et al. | May 8, 1956 |
| 2,753,642 | Sullivan | July 10, 1956 |
| 2,780,350 | Simon et al. | Feb. 5, 1957 |
| 2,787,809 | Stastny | Apr. 9, 1957 |
| 2,855,021 | Hoppe | Oct. 7, 1958 |

FOREIGN PATENTS

| | | |
|---|---|---|
| 805,708 | Germany | May 28, 1951 |

UNITED STATES PATENT OFFICE
CERTIFICATE OF CORRECTION

Patent No. 2,983,963                            May 16, 1961

Georg Elis Jodell et al.

It is hereby certified that error appears in the above numbered patent requiring correction and that the said Letters Patent should read as corrected below.

Column 2, line 8, for "linear" read -- liner --; line 21, for "heating" read -- heat --; column 4, lines 6 and 7, for "thermoplistic" read -- thermoplastic --; same column, lines 44 and 45, for "themoplastic" read -- thermoplastic -- column 5, lines 12 and 13, strike out "frame 42 is employed which snugly fits in the annular-shaped"; lines 39 and 40, strike out "inner wall layer is built up to the region 46, after which the", same column, line 74, for "slitable" read -- suitable --; column 7, line 2, for "theim" read -- them --.

Signed and sealed this 21st day of November 1961.

(SEAL)
Attest:

ERNEST W. SWIDER
Attesting Officer

DAVID L. LADD
Commissioner of Patents

USCOMM-DC